United States Patent
Custers et al.

(10) Patent No.: US 11,268,765 B2
(45) Date of Patent: Mar. 8, 2022

(54) FAST RESPONSE HEATERS AND ASSOCIATED CONTROL SYSTEMS USED IN COMBINATION WITH METAL TREATMENT FURNACES

(71) Applicant: Novelis Inc., Atlanta, GA (US)

(72) Inventors: David Michael Custers, Amherstview (CA); Michael Bull, Brighton, MI (US); Andrew Hobbis, Bath (CA)

(73) Assignee: Novelis Inc., Atlanta, GA (US)

( * ) Notice: Subject to any disclaimer, the term of this patent is extended or adjusted under 35 U.S.C. 154(b) by 38 days.

(21) Appl. No.: 16/840,842

(22) Filed: Apr. 6, 2020

(65) Prior Publication Data

US 2020/0232706 A1    Jul. 23, 2020

Related U.S. Application Data

(62) Division of application No. 15/190,683, filed on Jun. 23, 2016, now Pat. No. 10,648,738.

(Continued)

(51) Int. Cl.
*F27D 13/00* (2006.01)
*C21D 9/46* (2006.01)
(Continued)

(52) U.S. Cl.
CPC .............. *F27D 13/00* (2013.01); *C21D 1/42* (2013.01); *C21D 1/52* (2013.01); *C21D 9/46* (2013.01);
(Continued)

(58) Field of Classification Search
CPC .. F27D 13/00; F27D 19/00; F27D 2019/0018; F27D 2019/0034; C21D 1/42;
(Continued)

(56) References Cited

U.S. PATENT DOCUMENTS 3,548,171 A * 12/1970 Kodz .................. G05D 23/1917
700/210
4,054,770 A    10/1977 Jackson et al.
(Continued)

FOREIGN PATENT DOCUMENTS

CN    104388667    3/2015
EP    2071262    6/2009
(Continued)

OTHER PUBLICATIONS

"Asservissement (automatique)", Wikipedia, https://fr.wikipedia.org/wiki/Asservissement_(automatique), Accessed from Internet on: Dec. 4, 2020, Believed to be published at least as early as Sep. 30, 2014, 1 page.

(Continued)

*Primary Examiner* — Scott R Kastler
(74) *Attorney, Agent, or Firm* — Kilpatrick Townsend & Stockton LLP (57) ABSTRACT

System and method for using fast response heaters to pre-heat metal before entering a metal treatment furnace, which may improve control over metal processing, especially in response to changes in material, mass flow rate, line speed, and/or desired treatment process. Fast response heaters may be used with control systems to adjust the output of the fast response heater based on operator inputs, direct or indirect sensing of process parameters, and/or the use of thermal models to quickly adjust fast response heater output while a metal treatment furnace remains at a constant temperature or slowly transitions into a new operating state. The resulting gains in process control result in higher quality products, reduced scrap, and increases in line speed and output.

20 Claims, 6 Drawing Sheets

Related U.S. Application Data (60) Provisional application No. 62/183,810, filed on Jun. 24, 2015.

(51) Int. Cl.

| | | |
|---|---|---|
| *C21D 1/42* | (2006.01) | |
| *C21D 1/52* | (2006.01) | |
| *F27D 11/06* | (2006.01) | |
| *F27D 19/00* | (2006.01) | |
| *C21D 11/00* | (2006.01) | |
| *C21D 9/56* | (2006.01) | |
| *C21D 9/60* | (2006.01) | |

(52) U.S. Cl.
CPC ............... *C21D 9/56* (2013.01); *C21D 9/562* (2013.01); *C21D 9/60* (2013.01); *C21D 11/00* (2013.01); *F27D 11/06* (2013.01); *F27D 19/00* (2013.01); *F27D 2019/0018* (2013.01); *F27D 2019/0034* (2013.01); *Y02P 10/20* (2015.11); *Y02P 10/25* (2015.11)

(58) Field of Classification Search
CPC ... C21D 1/52; C21D 9/46; C21D 9/56; C21D 9/562; C21D 9/60; C21D 11/00
See application file for complete search history.

(56) References Cited

U.S. PATENT DOCUMENTS

| | | | |
|---|---|---|---|
| 4,165,964 | A | 8/1979 | Yonezawa et al. |
| 4,239,483 | A | 12/1980 | Iida et al. |
| 4,861,389 | A | 8/1989 | Bryant et al. |
| 5,052,661 | A | 10/1991 | Dunlay et al. |
| 5,137,586 | A | 8/1992 | Klink |
| 5,336,868 | A | 8/1994 | Schluckebier et al. |
| 5,401,941 | A | 3/1995 | Mauve et al. |
| 5,739,506 | A | 4/1998 | Hanton et al. |
| 5,770,838 | A | 6/1998 | Rohrbaugh et al. |
| 6,679,958 | B1 | 1/2004 | Tundal et al. |
| 7,368,689 | B2 | 5/2008 | Roehr et al. |
| 7,594,811 | B2 | 9/2009 | Lugnet et al. |
| 7,618,501 | B2 | 11/2009 | Gartz |
| 7,625,455 | B2 | 12/2009 | Axelsson et al. |
| 7,671,307 | B2 | 3/2010 | Nikanorov et al. |
| 7,763,117 | B2 | 7/2010 | Ritzen et al. |
| 8,057,221 | B2 | 11/2011 | Rangmark et al. |
| 8,057,222 | B2 | 11/2011 | Rangmark et al. |
| 9,035,486 | B2 | 5/2015 | Asplund |
| 9,062,357 | B2 | 6/2015 | Gripenberg et al. |
| 2002/0011486 | A1 | 1/2002 | Anderhuber et al. |
| 2002/0148830 | A1 | 10/2002 | Ross |
| 2003/0015261 | A1 | 1/2003 | Bull et al. |
| 2003/0047558 | A1 | 3/2003 | Niklaus et al. |
| 2007/0160948 | A1 | 7/2007 | Gartz |
| 2007/0235446 | A1 | 10/2007 | Cao et al. |
| 2007/0267113 | A1 | 11/2007 | Staley et al. |
| 2009/0050622 | A1 | 2/2009 | Pohl et al. |
| 2009/0174125 | A1 | 7/2009 | Ekman et al. |
| 2009/0188591 | A1 | 7/2009 | Herbert et al. |
| 2009/0255924 | A1 | 10/2009 | Lovens |
| 2010/0224293 | A1 | 9/2010 | Wang et al. |
| 2014/0251505 | A1 | 9/2014 | Blumenau et al. |
| 2015/0275326 | A1 | 10/2015 | Gripenberg et al. |
| 2017/0306466 | A1* | 10/2017 | Meyer ................. C21D 1/26 |

FOREIGN PATENT DOCUMENTS

| | | |
|---|---|---|
| EP | 3006579 A1 | 4/2016 |
| JP | 5573831 | 6/1980 |
| JP | 6070127 | 4/1985 |
| JP | 032331 | 1/1991 |
| JP | 09227954 | 9/1997 |
| JP | H10298668 A | 11/1998 |
| JP | 2003027172 | 1/2003 |
| JP | 2003089860 | 3/2003 |
| JP | 2004027322 | 1/2004 |
| JP | 2011179035 | 9/2011 |
| KR | 1020040091285 | 10/2004 |
| WO | 2010049445 A1 | 5/2010 |
| WO | 2014053657 | 4/2014 |
| WO | 2016037922 A1 | 3/2016 |

OTHER PUBLICATIONS

"Heat Treatment of Strip Aluminium using TFX," Aluminium Industry, Jan. 1988, vol. 7, No. 1.

Brun, "Recuit continu," Techniques de L'ingenieur, Dec. 10, 1996, vol. M7955 V1.

Canadian Patent Application No. 2,989,624 , Office Action dated Dec. 17, 2020, 4 pages.

European Patent Application No. 16736970.1 , Notice of Opposition dated Nov. 10, 2020, 31 pages.

European Patent Application No. 16736970.1 , Notice of Opposition dated Nov. 6, 2020, 9 pages.

Indian Patent Application No. 201817000879 , First Examination Report dated Sep. 25, 2020, 6 pages.

Japanese Patent Application No. 2017-565807 , Office Action dated Aug. 25, 2020, 8 pages.

Stucky, "Traitements Thermiques Des Alliages D'aluminium—Materiels Et Recommandations," Les Techniques de L'ingenieur, Jun. 10, 2011, vol. M1290 V2.

Waggott et al., "Transverse flux induction heating of aluminium alloy strip", Metals Technology, Dec. 1982, pp. 493-498, vol. 9, Taylor & Francis.

Japanese Patent Application No. 2019-099395, Office Action dated Apr. 6, 2021, 5 pages.

U.S. Appl. No. 15/190,683 , "Final Office Action", dated Sep. 6, 2019, 8 pages.

U.S. Appl. No. 15/190,683 , "Non-Final Office Action", dated Apr. 30, 2019, 9 pages.

U.S. Appl. No. 15/190,683 , "Notice of Allowance", dated Jan. 29, 2020, 8 pages.

U.S. Appl. No. 15/190,683 , "Restriction Requirement", dated Feb. 15, 2019, 6 pages.

Canadian Application No. 2,989,624 , "Office Action", dated Nov. 26, 2018, 3 pages.

Canadian Application No. 2,989,624 , "Office Action", dated Jul. 3, 2019, 5 pages.

Chinese Application No. 201680036997.3 , "Office Action", dated Jun. 24, 2019, 12 pages.

Chinese Application No. 201680036997.3 , "Office Action", dated Nov. 26, 2019, 12 pages.

Chinese Application No. 201680036997.3 , "Office Action", dated Nov. 1, 2018, 15 pages.

European Application No. 16736970.1 , "Notice of Decision to Grant", dated Jan. 8, 2020, 2 pages.

European Application No. 16736970.1 , "Office Action", dated Jan. 22, 2019, 4 pages.

Japanese Application No. 2017-565807 , "Office Action", dated Feb. 19, 2019, 8 pages.

Japanese Application No. 2017-565807 , "Office Action", dated Nov. 6, 2018, 8 pages.

Korean Application No. 10-2018-7002100 , "Notice of Decision to Grant", dated Feb. 4, 2020, 1 page.

Korean Application No. 10-2018-7002100 , "Office Action", dated Jul. 25, 2019, 11 pages.

International Application No. PCT/US2016/038946 , "International Preliminary Report on Patentability", dated Jan. 4, 2018, 6 pages.

International Application No. PCT/US2016/038946 , "International Search Report and Written Opinion", dated Oct. 5, 2016, 8 pages.

Application No. CA2,989,624 , Office Action, dated Apr. 22, 2020, 3 pages.

Application No. CN201680036997.3 , Office Action, dated Apr. 16, 2020, 3 pages.

Application No. JP2019-099395 , Office Action, dated Jul. 14, 2020, 10 pages.

(56) References Cited

OTHER PUBLICATIONS

Canadian Application No. 2,989,624, Notice of Allowance, dated Jul. 20, 2021, 1 page.
European 16736970.1, Summonsto Attend Oral Proceedings, mailed Jun. 8, 2021, 20 pages.
Brazilian Application No. BR1120170276801, Office Action, dated Sep. 8, 2021, 3 pages.

* cited by examiner

FAST RESPONSE HEATERS AND ASSOCIATED CONTROL SYSTEMS USED IN COMBINATION WITH METAL TREATMENT FURNACES

CROSS REFERENCE TO RELATED APPLICATION

The present application is a divisional of U.S. patent application Ser. No. 15/190,683 filed Jun. 23, 2016, now U.S. Pat. No. 10,648,738 issued May 12, 2020, and entitled "FAST RESPONSE HEATERS AND ASSOCIATED CONTROL SYSTEMS USED IN COMBINATION WITH METAL TREATMENT FURNACES," which claims the benefit of U.S. Provisional Patent Application No. 62/183,810 filed Jun. 24, 2015 and entitled "FAST RESPONSE HEATERS AND ASSOCIATED CONTROL SYSTEMS USED IN COMBINATION WITH METAL TREATMENT FURNACES," both of which are hereby incorporated by reference in their entireties.

TECHNICAL FIELD

The present disclosure generally relates to furnaces for metal treatment processes. More specifically, the present disclosure relates to the use of fast response heaters in combination with traditional furnaces and their associated control systems.

BACKGROUND

Furnaces are routinely used in the production and treatment of metals to anneal, harden, age, pre-age, treat, or soften metals for further processing. Some furnaces may be used to treat metal sheet or plate in a continuous manner as the material is drawn through the length of the furnace.

Today, increasing demand for metal sheet and plate, combined with a drive for higher material quality and more complex treatment processes, has led to an increase in the size of treatment furnaces. Furnaces have been developed with increasing length and multiple heating zones of differing temperatures for more complex heating processes, higher quality product, and faster processing speeds.

However, longer furnaces are expensive and consume valuable space in metal processing plants. Longer furnaces also add additional stresses to the metal sheet or plate as it is drawn through the length of the furnace. The additional stresses due to a longer furnace can cause instability of the metal sheet or plate and can lead to tearing or material defects. Longer furnaces also have significant thermal inertia and require relatively long periods of time to raise or lower the temperature of their treatment zones. As a result, they may be slow to respond to changes in material composition, material thickness, line speed, or material treatment process. The slow response of traditional metal treatment furnaces requires either lengthy delays during processing or the use of transition material that must then be scrapped as a waste product.

SUMMARY

Aspects of the present disclosure relate to the use of fast response heaters in combination with metal treatment furnaces and an optional associated control system. The fast response heater is used to pre-heat metal sheet or plate before it enters the main treatment furnace. The fast response heater can adjust the temperature of the incoming metal sheet or plate quickly to accommodate rapid changes in material, material thickness, line speed, or process type. The fast response heater can be used continuously to compensate for variations in material or process parameters, to speed up material processing with an existing metal treatment furnace, and/or to allow the main treatment furnace to run at a lower temperature. Alternatively, the fast response heater may be used during transitions of the metal treatment furnace to compensate for the thermal inertia and slow response time of the main furnace. For example, when the metal treatment furnace is transitioning to a higher temperature regime, the fast response heater may compensate by pre-heating the metal strip or plate. As the temperature of the metal treatment furnace increases, the fast response heater may gradually lower the amount of pre-heating to maintain proper process parameters.

The fast response heater may be controlled manually, or it may use an active or passive control system to vary the amount of pre-heating applied to the metal strip or plate. The control system may include thermal models or sensors for measurement and feedback control. For example, the control system may include direct or indirect sensing of furnace temperature, metal temperature before and after the fast response heater, material thickness, and/or may include sensors to quantify material quality, such as flatness, before or after treatment.

BRIEF DESCRIPTION OF THE DRAWINGS

Illustrative embodiments of the present disclosure are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to the use of a fast response heater and optional control system in combination with a metal treatment furnace used to treat metal during production. A fast response heater allows for the pre-heating of material, generally a metal, prior to the material entering a larger metal treatment furnace. The fast response heater is smaller than the metal treatment furnace and allows for much faster dynamic changes in the amount of heat applied to the material, and consequently much faster changes to the material temperature, even when there are changes to the type of material, material thickness, line speed, and/or mass flow rate of the material. Some non-limiting examples of fast response heaters include induction heaters, including but not limited to induction heaters with adjustable current frequency, or direct flame impingement heaters, though any type of heater may be used so long as it is able to quickly change the amount of heat and temperature imparted to the material. The fast response heater may work in conjunction with a control system for varying the heat output. That control system may rely on any suitable input, such as sensors, thermal models, operator input of parameters, and/or direct operator control or any combination thereof.

The fast response heater is typically placed in front of a larger metal treatment furnace that carries out the bulk of the metal treatment process. Examples of such processes include, but are not limited to, aging, pre-aging, hardening, solution heating, annealing, or the like. The addition of a fast response heater before the metal treatment furnace allows the fast response heater to pre-heat the material before it enters the metal treatment furnace. The metal treatment furnace, because of its large size, cannot quickly change its temperature to accommodate changes to line speed, process type, material type, and/or material mass flow rate. However, the fast response heater can compensate for the slow response of the metal treatment furnace by quickly altering the amount of pre-heat with variations in line speed, mass flow rate, material type, and/or process type. The fast response heater is used to vary the overall heat added to the material to maintain the proper process parameters while the metal treatment furnace is allowed to slowly change temperature or remain at constant temperature while the overall process is varied by the fast response heater. The fast response heater may be used to provide all the variation necessary in the overall treatment process while the metal treatment furnace remains at a constant temperature, or the fast response heater may continually adjust to provide necessary variation in the overall treatment process and compensate for the transitional behavior of the metal treatment furnace. As used herein, a constant temperature of the metal treatment furnace may be one that varies by no more than approximately ±10% from a preselected temperature. In certain cases, a constant temperature of the metal treatment furnace may be one that varies by no more than approximately ±5% from a preselected temperature. In other cases, a constant temperature of the metal treatment furnace may be one that varies by no more than approximately ±2% from a preselected temperature. Any temperature may be selected for the metal treatment furnace or its individual zones based on the needs of a particular process or the capabilities of the metal treatment furnace and associated equipment. In some cases, such as when the metal being processed is aluminum, preselected temperatures typically may range from approximately 430-630 degrees Celsius for the metal treatment furnace or any one of its individual zones.

The use of a fast response heater provides a number of advantages over the use of a metal treatment furnace alone. The fast response heater can be used to reduce the length of a metal treatment furnace or eliminate the need for additional heating processes at other parts of the production line. Use of a fast response heater allows for increased production rates and for dynamic control over the overall metal treatment process. The ability to rapidly change the amount of heat applied to the metal with the fast response heater allows the metal treatment furnace to operate continually during changeovers in process or material without downtime or the creation of scrap during the transition periods of the metal treatment furnace. The increased precision and control also results in higher quality products.

It is often desirable to control the grain size of metal during processing. In particular, it can be advantageous to produce metal sheet or plate with a smaller grain size after the treatment process. A fast response heater may quickly heat the metal sheet or plate to recrystallize the material more rapidly than would be possible with the metal treatment furnace alone. The faster heating rate may lead to smaller grain size in the metal sheet or plate and improved product quality. More generally, the fast response heater can be used to vary the amount of heat applied and the rate of application of heat to the metal sheet or plate to increase or decrease grain size in the final product. For example, simulations show that cold rolled 6000-series aluminum sheet annealed in temperatures of approximately 400-500 degrees Celsius may achieve an average grain size in the range of approximately 20 μm to 30 μm when exposed to a heating rate of approximately 120-160 degrees Celsius per second, which is possible when using a fast response heater. This is, on average, a grain size approximately 4 μm smaller than that achieved with a heating rate of approximately 60-80 degrees Celsius per second, a rate that is more typical of a metal treatment furnace alone, can be achieved using the fast response heater. While different metals, alloys, and/or treatment processes may require different parameters, conditions, and/or set points that those discussed above, the ability of a fast response heater to induce higher heating rates and quickly vary those heating rates in response to changes in process conditions allows for greater control over metal grain size and consistency during production.

A fast response heater may also improve process stability by allowing for added control over the uniformity of heating and temperature across the width of the metal sheet or plate. As used herein, the term metal sheet may include metal sheets, metal plates, metal strips, or others. With traditional heating methods, it is often difficult, if not impossible, to create a uniform temperature gradient across the width of the metal sheet or plate as it passes through the treatment process. A fast response heater may offer additional control because it may quickly vary the amount of heating applied to the metal sheet or plate, and it may offer opportunities for control by selectively heating or cooling across the width of the metal sheet or plate.

Any combination of heaters can be used in a fast response heater, such as any combination of one or more of an induction heater, a direct flame impingement heater, or other heater. In certain cases, the fast response heater may include multiple heaters, or multiple flame sources in the case of a direct flame impingement heater. It may also be possible to combine an induction heater with a direct flame impingement heater to take advantage of the different heating characteristics of each heat source. For example, induction heaters may be used to initiate heating in the metal sheet or plate as it passes through the fast response heater. Once an initial temperature gradient has been established, a direct flame impingement heater may be used to target areas of lower temperature across the width of the metal sheet or plate. In certain cases, the temperature gradient across the width of the metal sheet or plate in the fast response heater may be controlled with sprays or gas nozzles. Targeted sprays or nozzles may spray a cooling gas or cooling mist to locally cool hot spots in the metal sheet or plate, or they may spray a heated gas or mist to warm cool spots and ensure uniformity during the metal treatment process.

Fast response heaters may be used during changeover in processes or materials where there is a need for increased temperature in the metal treatment furnace. However, fast response heaters also provide functionality when there is changeover to a process that requires a lower temperature in the metal treatment furnace. For example, the metal treatment furnace may be run at a lower, continuous temperature. The fast response heater may then be used to provide pre-heating which serves both to absorb variations in line speed, material, mass flow rate, and/or increases the overall process heat flow to a desired level while the metal treatment furnace runs at a lower (or constant) temperature. Then, when there is a need to change over to a treatment process that requires a lower temperature, the fast response heater may quickly reduce the level of pre-heating or eliminate it altogether while the metal treatment furnace remains at a constant temperature. The ability to operate the metal treatment furnace at a lower and/or constant temperature gives additional flexibility in metal production and the potential for increased efficiency and lower running costs.

In other circumstances, it may be desirable to run a metal treatment furnace at a very high heat head to perform certain types of metal treatment processes. A fast response heater may also be used to safely run a metal treatment furnace under high heat head conditions while offering additional safety and flexibility in the overall treatment process. For example, it may be desirable to run metal sheet or plate through a metal treatment furnace at a high heat head and high mass flow rate. Said differently, the metal sheet or plate would be exposed to higher metal treatment furnace temperatures, but would move through the treatment process at a higher rate of speed to ensure the metal sheet or plate does not melt during the treatment process. Changes in line speed under these circumstances can lead to dangerous or unstable conditions where the metal sheet or plate may melt in the metal treatment furnace, leading to equipment damage, loss of productivity, and potential safety hazards. However, if a fast response heater is used to pre-heat the metal sheet or plate before it enters the metal treatment furnace, it may account for and adjust the overall process to avoid dangerous treatment conditions. For example, if the throughput speed of the metal sheet or plate unexpectedly or suddenly slows, either due to malfunction, operator error, or changing plant conditions, the fast response heater may quickly reduce the amount of heating applied to the metal sheet or plate before it enters the metal treatment furnace. Effectively, the rapid removal of pre-heat from the metal sheet or plate will cause the metal to enter the metal treatment furnace at a lower temperature, allowing it to pass through at a slower rate with reduced risk of melting.

There may be other circumstances or situations where the fast response heater may independently treat metal sheet or plate without the use of a metal treatment furnace. During these processes, the fast response heater may adjust its heat output and throughput speed to treat the metal sheet or plate at a desired temperature for the required dwell time.

Figure 1:
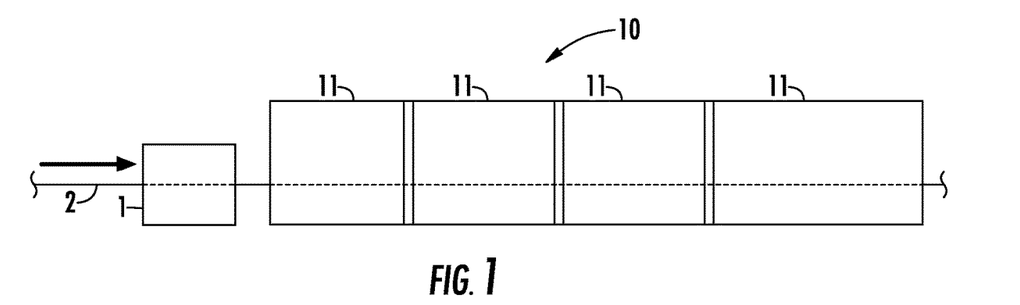
FIG. 1 is a schematic side view of a fast response heater positioned at or near the opening of a metal treatment furnace.

FIG. 1 is a schematic side view of a fast response heater 1 positioned at or near the opening of a metal treatment furnace 10. The metal treatment furnace 10 may contain multiple zones 11, each of which may have different temperatures, pressures, atmospheric compositions, or other process characteristics or parameters. The fast response heater 1 is positioned at or near the entrance of the metal treatment furnace 10 where it may apply heat to metal 2 before the metal 2 enters the metal treatment furnace 10. In some examples, the metal 2 may spend approximately two to ten seconds passing through the fast response heater 1. However, depending upon the characteristics of the metal 2, metal treatment furnace 10, and/or fast response heater 1, the residence time of the metal 2 in the fast response heater 1 may be any suitable amount of time as desired or required by a particular process. For example, for reheater applications used for preaging or for maintaining strip warmth for downstream applications (e.g., drying of stencil ink or application of dry lubricant), the metal 2 may spend less than two seconds passing through the fast response heater 1. In an example, multiple fast response heaters can be used at spaced-apart downstream distances to maintain a desired minimum strip temperature that is above ambient temperature. The desired minimum strip temperature can be set to maximize efficiency or results in downstream processes or in general performance of an entire process line (e.g., a minimum strip temperature may allow for better lubrication dispersion and/or maneuverability of the metal strip between processes in a process line). In another example, one or more fast response heaters can quickly increase the strip temperature to a desired minimum strip temperature from a lower temperature.

The use of the fast response heater 1 may be continuous or intermittent, either as part of an overall treatment process or to help stabilize the metal treatment process during periods of transitory operation of the metal treatment furnace 10. In some cases, the heat output of the fast response heater 1 is large enough that the metal treatment furnace 10 may run at a constant temperature (i.e., without changing the settings of the metal treatment furnace 10) while the fast response heater 1 compensates for any changes in process, production speed, or mass flow of metal 2 to maintain stability of the line. For example, when the treatment process, material, material geometry, or mass flow rate of metal 2 through the metal treatment furnace 10 changes to require a higher temperature in the metal treatment furnace 10, the fast response heater 1 may compensate by adding heat to the metal 2 during the transitory period while the metal treatment furnace 10 comes up to operating temperature.

The fast response heater 1 is a heater which may rapidly increase or decrease the amount of heat applied to the metal 2, such as an induction heater or direct flame impingement heater. More specifically, induction heaters which allow for variability in the frequency of the alternating current may be particularly useful in that they have additional methods for controlling the amount of heat energy imparted to the metal 2. Because the fast response heater 1 may adjust the amount of heat applied to the metal 2 relatively rapidly, it may compensate for the slower response rate of the metal treatment furnace 10 by continuously adding heat to the metal 2 while the metal treatment furnace 10 adjusts to a new temperature at a slower rate. As the metal treatment furnace 10 increases in temperature, the fast response heater 1 may gradually reduce the amount of pre-heating applied to the metal 2 to maintain the proper amount of heat applied to the metal 2 in the overall treatment process. The addition of a fast response heater 1 to a traditional metal treatment furnace 10 may be used in conjunction with any metal in any geometry undergoing any treatment process where rapid changes to the amount of overall heat applied to the metal are necessary or desirable. However, the use of a fast response heater 1 to pre-heat metal 2 before it enters metal treatment furnace 10 may be particularly useful in the production of aluminum or aluminum alloys that are being processed as plate or sheet.

In certain cases, the fast response heater 1 may be used to provide one or more additional treatment steps to the metal 2 before it enters the main metal treatment furnace 10. However, in some examples, the fast response heater 1 may be used to increase the efficiency of an existing metal treatment process. Said differently, and by way of example, the fast response heater 1 may be used to compensate for the slow response of the metal treatment furnace 10 to maintain an existing metal treatment process as process conditions change. The fast response heater 1 may allow the metal 2 to undergo a consistent treatment process despite changes in alloy, plate or sheet geometry, mass flow rate, or any other process parameter that may affect quality or consistency of the final product.

Figure 2:
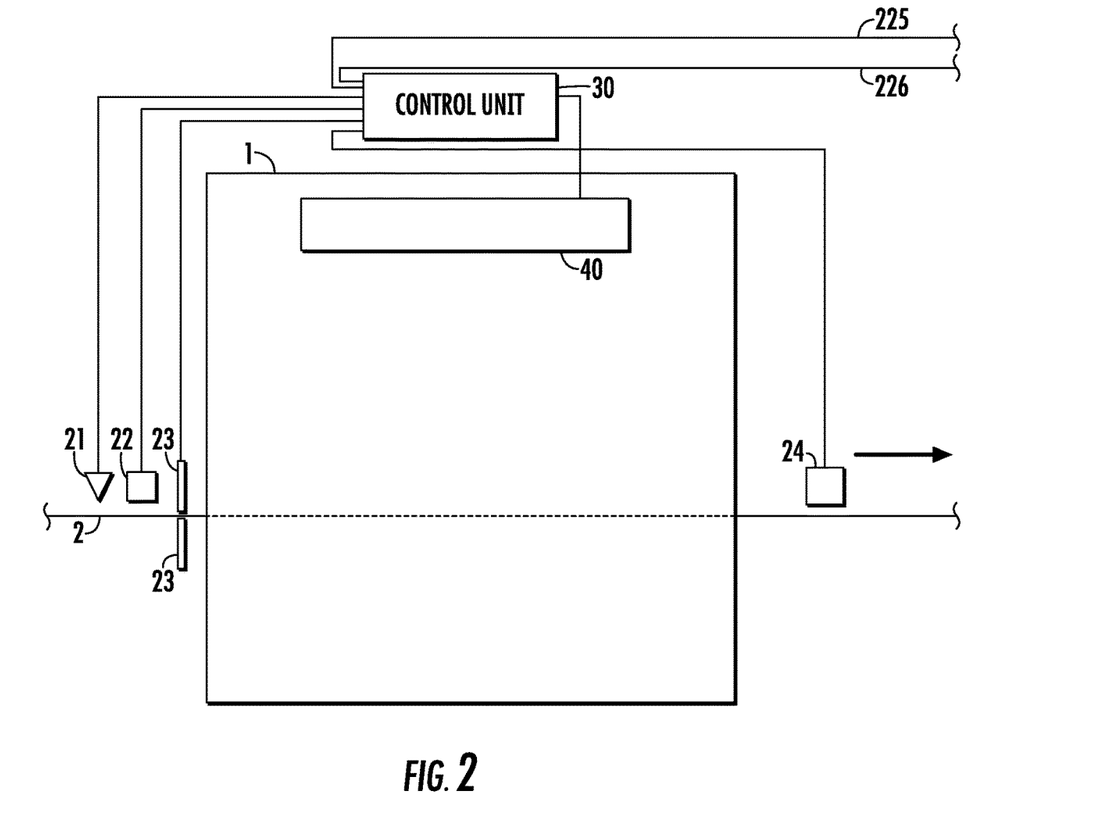
FIG. 2 is a schematic side view of a fast response heater with optional sensing and control elements.

FIG. 2 is a schematic side view of the fast response heater 1 with an optional control unit 30. The control unit 30 may take real time readings of process parameters through any number of sensors. For example, the control unit 30 may receive signals from a speed sensor 21, which measures the rate of progression of the metal 2, such as a plate or sheet, through the fast response heater 1. A temperature sensor 22 may be used to determine the incoming temperature of the metal 2 before entering the fast response heater 1. Determining the incoming temperature of the metal using the temperature sensor 22 allows for more accurate process control and adjustment of fast response heater 1 to account for weather or plant conditions. The control system may also incorporate a thickness sensor 23 to measure the gauge or geometry of metal 2 as it enters the fast response heater 1. The thickness measurement may then be used by the control unit 30 to adjust the fast response heater element 40 to compensate for varying gauge material and, in combination with a measurement of speed from speed sensor 21, determine the mass flow rate of metal 2 through the fast response heater 1. The mass flow rate of the metal 2 through the fast response heater 1 can be used by the control unit 30 to determine the necessary level of output for the amount of material passing through the system. The control system may also incorporate an exit metal temperature sensor 24 to monitor the condition of the metal 2 after pre-heating and before it enters the main metal treatment furnace 10 (not shown). The exit metal temperature sensor 24 may allow for use of a feedback-type control system that actively adjusts heater element 40 output to achieve a static or dynamic target metal temperature of the metal 2 as it leaves the fast response heater 1.

Still referring to FIG. 2, the control unit 30 may receive additional signal information from sensors reading conditions within the metal treatment furnace 10 (FIG. 1). When the fast response heater 1 is pre-heating the metal 2 to compensate for the slow response time of the metal furnace treatment, it may be desirable for the control unit 30 to receive signal information about the conditions of one or more metal treatment furnace zones 11. For example, the control unit 30 may receive a furnace zone metal temperature signal 225 (e.g., from furnace zone metal temperature sensor 25 of FIG. 3) indicating the temperature of the metal 2 or a furnace zone air or atmosphere temperature signal 226 (e.g., from furnace zone air/atmosphere temperature sensor 26 of FIG. 3) indicating the temperature of the atmosphere inside the furnace zone 11 of metal treatment furnace 10. One or both of these two signals 225, 226 may then be used to calculate the heat head (difference in temperature between the furnace zone atmosphere and metal in that zone) in any particular zone 11 of the metal treatment furnace 10. The control unit 30 can then evaluate the furnace zone temperature and the heat head to calculate the rate of heat transfer into the metal 2 within the metal treatment furnace 10 and adjust the output of the heater element 40 to control the amount of pre-heat applied to the metal 2. Information about furnace zone temperature and the temperature of the metal 2 within each zone can be used to calculate the amount of heat transfer to the metal 2 from the metal treatment furnace 10. This information can be used by the control unit 30 to continuously adjust the heating element 40 to transfer the proper amount of heat to the metal 2 as required. As the metal treatment furnace 10 transitions to the correct steady-state operating temperature, the control unit 30 will sense the changing conditions and adjust the output of the heater element 40 accordingly.

Any number of additional control strategies may be used by the control unit 30 to adjust the heater element 40 of the fast response heater 1 to maintain process parameters within a specified range for the particular metal and treatment. For example, the control unit 30 may use sensors and feedback information as described above to maintain optimal process conditions by varying the output of the fast response heater 1. The control unit 30 may also use thermal models, which could be, for example, transient, non-transient, or any other type of thermal model, of the fast response heater 1, metal treatment furnace 10, and/or different types, shapes, or thicknesses of metal 2 to determine the correct output of the fast response heater 1. For example, an operator may enter information into the control unit 30 regarding the desired metal treatment furnace 10 conditions, the type of metal 2 to be treated, and/or the mass flow rate of the metal 2. The control unit 30, which may be previously programmed, can then use thermal models to determine the correct output of the fast response heater 1 and how to change the output over time as the metal treatment furnace 10 achieves steady state operation. The control unit 30 may use any combination of sensors, thermal models, and/or operator inputs to determine the correct output of the fast response heater 1 to compensate for changing process conditions. Furthermore, the control unit 30 may use information from one, all, or any combination of the sensors noted above, or may incorporate additional sensors not listed above such as a dedicated mass flow sensor.

Figure 3:
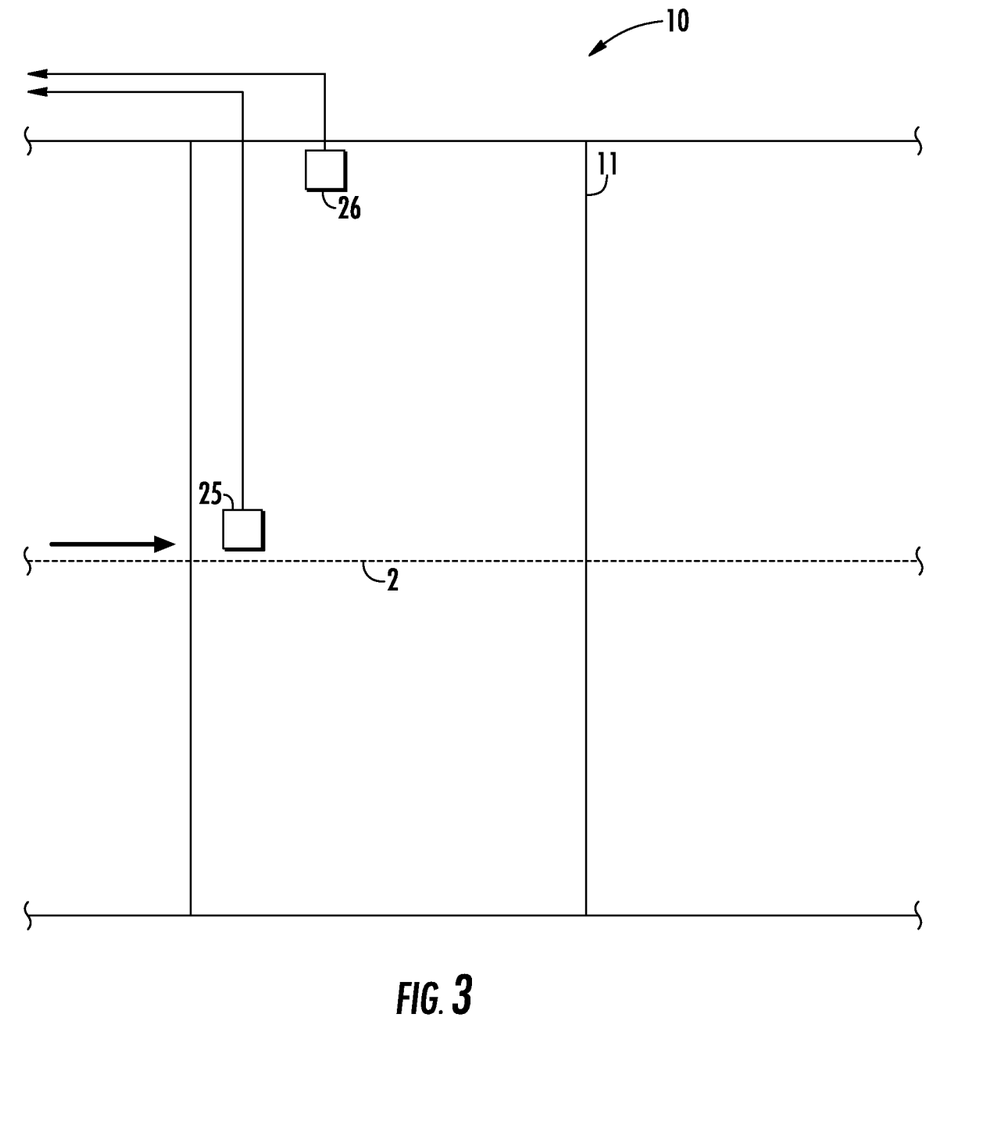
FIG. 3 is a schematic side view of a metal treatment furnace zone with optional sensing and control elements.

FIG. 3 is a schematic side view of metal 2 passing through a zone 11 of the metal treatment furnace 10. The furnace zone 11 features an optional furnace zone metal temperature sensor 25 and an optional furnace zone air/atmosphere temperature sensor 26. These sensors 25, 26 may then send signals (e.g., signals 225, 226 of FIG. 2) to a control unit (e.g., control unit 30 of FIG. 2) so that the control unit may control the heat output of a fast response heater (e.g., fast response heater 1 of FIG. 2).

Figure 4:
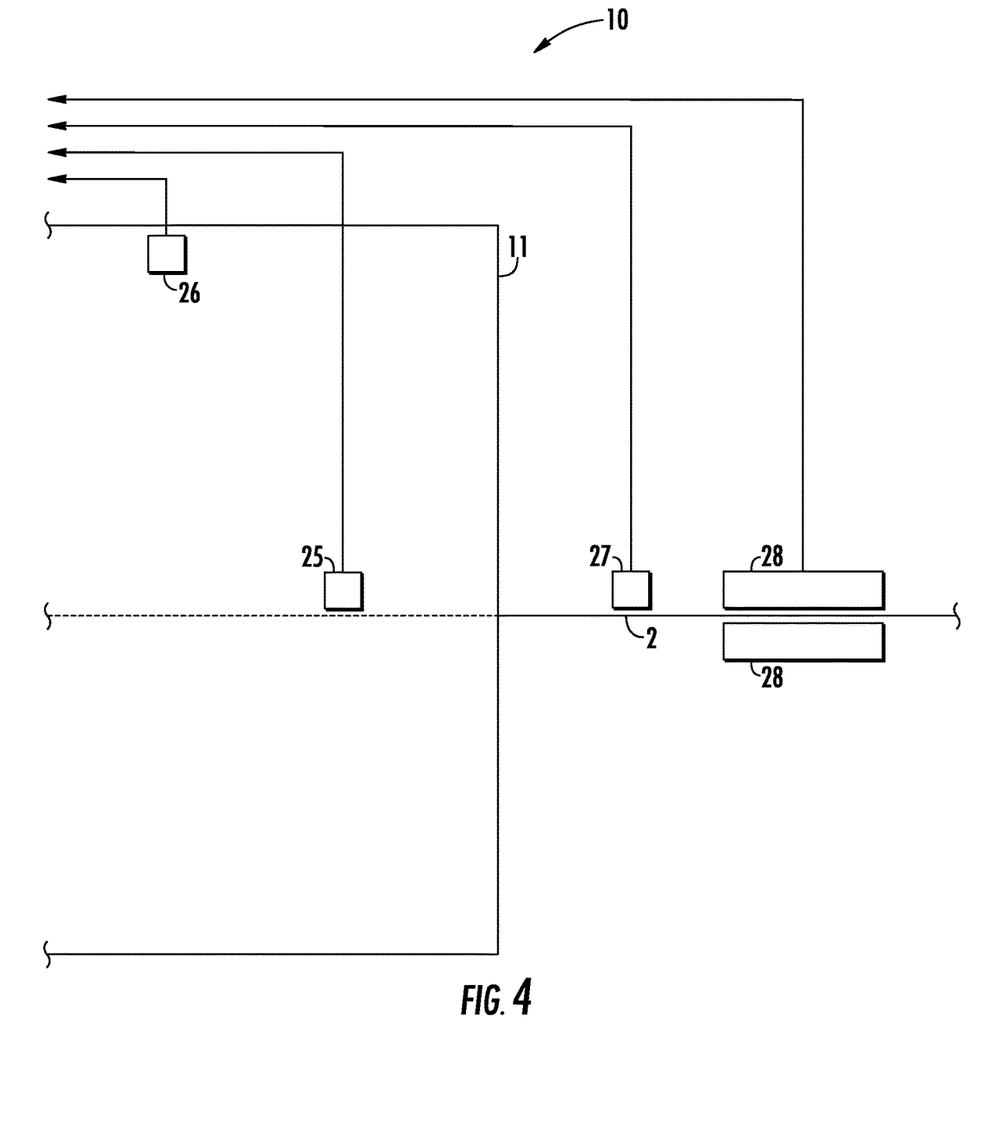
FIG. 4 is a schematic side view of a metal treatment furnace zone with optional sensing and control elements.

FIG. 4 is a schematic side view of metal 2 passing through the final zone 11 of the metal treatment furnace 10. The furnace zone 11 incorporates an optional furnace zone metal temperature sensor 25 and an optional furnace zone air/atmosphere temperature sensor 26. As noted above, these sensors may be used by a control unit (e.g., control unit 30 of FIG. 2) to adjust the output of a fast response heater (e.g., fast response heater 1 of FIG. 2) to maintain optimal process parameters under changing conditions. At or near the end of the metal treatment furnace 10, an optional furnace exit metal temperature sensor 27 may be installed. This sensor 27 may relay information about the temperature of the metal 2 as it leaves the metal treatment furnace 10 so that a control unit (e.g., control unit 30) may adjust the output of a fast response heater (e.g., fast response heater 1) to account for changing process conditions or transient behavior of the metal treatment furnace 10. An optional flatness or quality sensor 28 may also be incorporated into the control system. The flatness or quality sensor 28 may relay information about the flatness or general quality conditions of the metal 2 to a control unit. The control unit (e.g., control unit 30) can then adjust the output of a fast response heater (e.g., fast response heater 1) to achieve improved quality of the final product.

Figure 5:
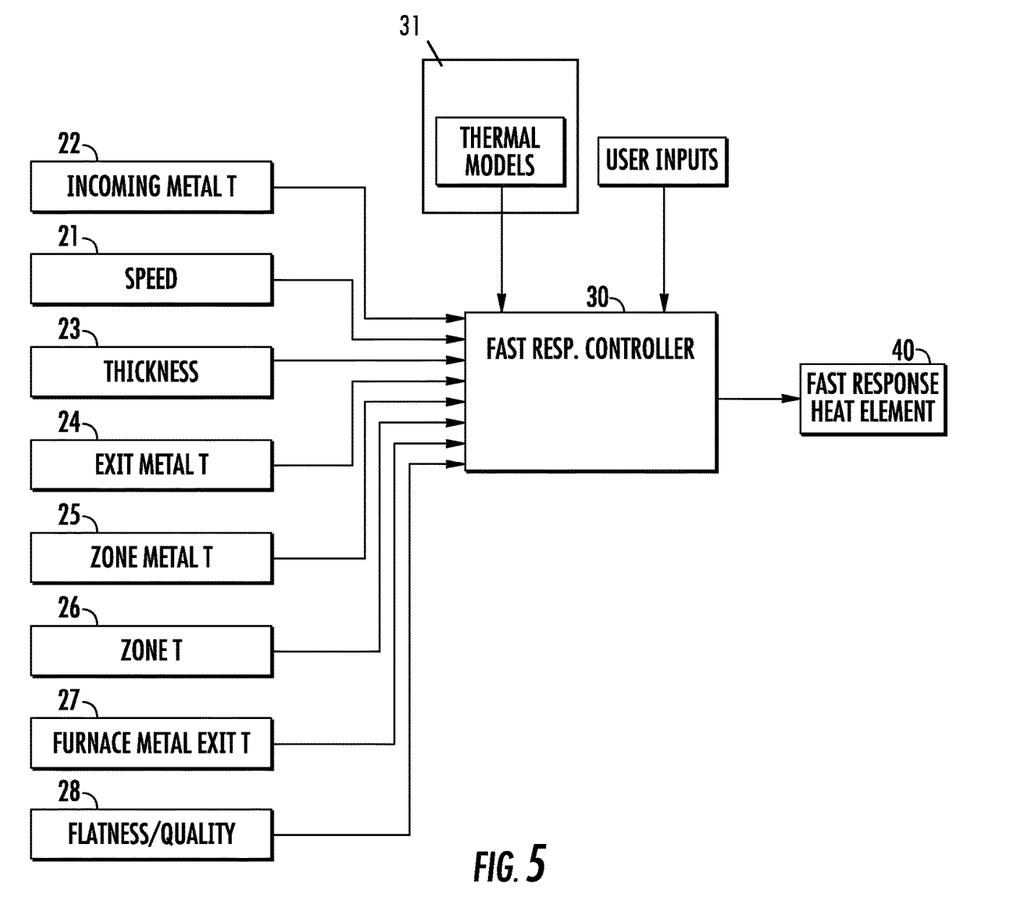
FIG. 5 is a schematic representation of an optional control system for a fast response heater.

FIG. 5 is a schematic illustration of an example of an optional control system. The control unit 30 may receive information from a number of sensors or sources. As shown, the control unit 30 may receive information from sensors relaying information about the incoming temperature of the metal 22, the incoming speed of the metal 21, metal thickness 23, metal temperature at fast response heater exit 24, metal treatment furnace zone metal temperatures 25, metal treatment furnace zone air/atmosphere temperatures 26, metal treatment furnace metal exit temperature 27, and/or flatness or quality 28. The control unit 30 may also receive inputs from an operator and/or thermal models of the fast response heater 1, metal 2, or metal treatment furnace 10. The control unit 30 may then incorporate one or more of these inputs into a control algorithm which produces an output signal that is sent to the heater element 40 of the fast response heater 1. In some cases, thermal models, other models, or stored or predetermined parameters can be stored in a data store 31 (e.g., a non-transitory data storage medium) coupled to or included within the controller 30.

Figure 6:
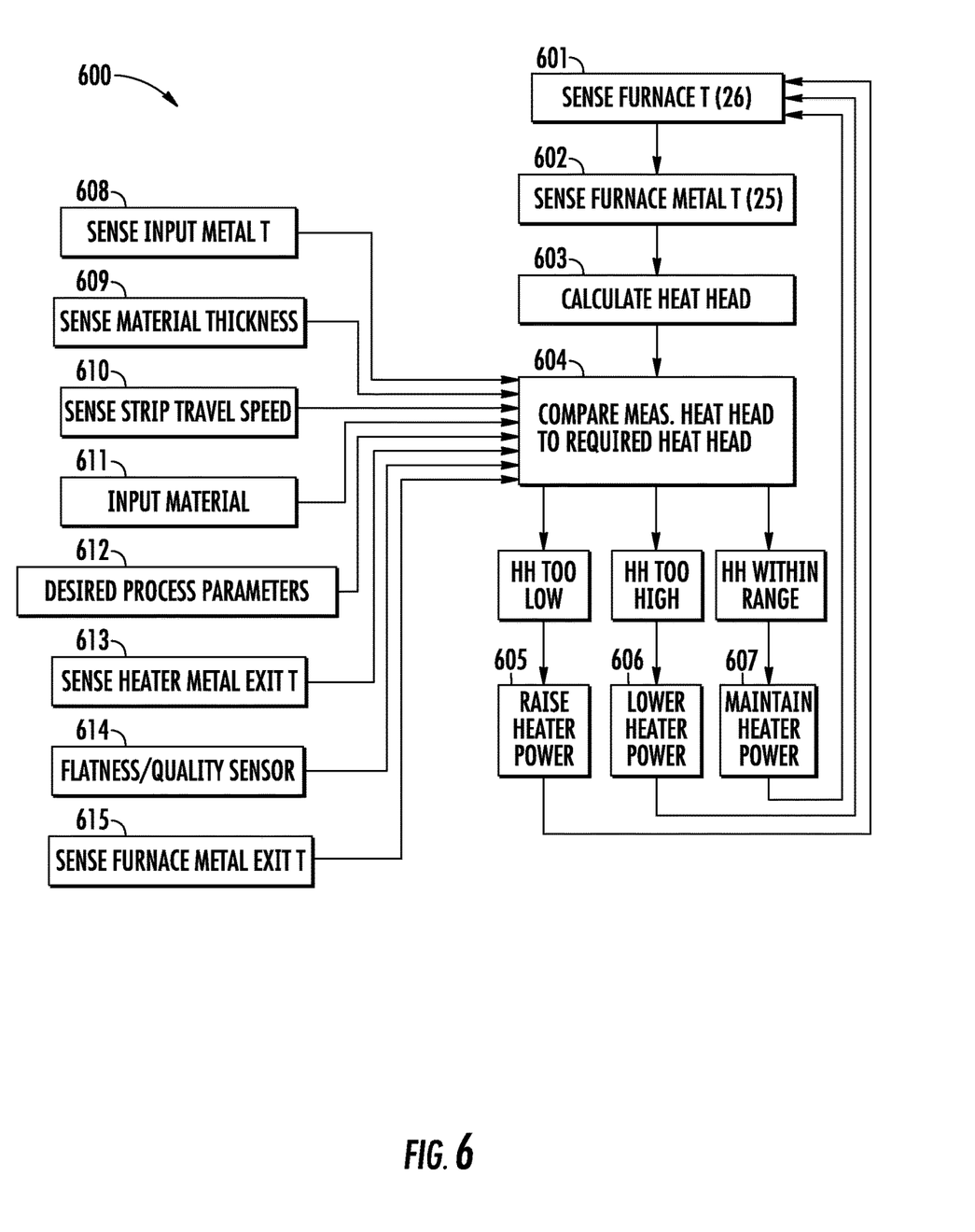
FIG. 6 is an example method for controlling the output of a fast response heater in relation to metal treatment processes carried out in a metal treatment furnace.

FIG. 6 is one sample control loop 600 for controlling the heat output of a fast response heater 1 in relation to the changing parameters and conditions of the metal treatment process. The control unit 30 senses metal treatment furnace zone air/atmosphere temperature at block 601 and metal treatment furnace zone metal temperature at block 602. The control unit 30 calculates the heat head for that particular metal treatment furnace zone at block 603 by finding the difference between the two temperatures sensed at blocks 601 and 602. The control unit 30 then compares this calculated heat head to a desired heat head at block 604. If the calculated heat head is below the desired heat head, then the control unit 30 raises the heat output of the fast response heater 1 at block 605. If the calculated heat head is above the desired heat head, then the control unit 30 lowers the heat output of the fast response heater 1 at block 606. If the calculated heat head is within range of the desired heat head, then the control unit 30 maintains the heat output of the fast response heater 1 at block 607. After the control unit 30 has adjusted the output of the fast response heater 1 at blocks 605, 606, and 607, the control unit 30 returns to block 601 and follows through the control loop 600 again. In some cases, comparing the measured heat head to the required heat head at block 604 can use hysteresis to determine when to raise the heater power at block 605, lower the heater power at block 606, or maintain the heater power at block 607. The amount and degree of hysteresis can be based on any suitable inputs, such as those depicted in blocks 608-615.

Still referring to FIG. 6, the control unit 30 may also sense or receive additional inputs into the sample control loop 600 to achieve greater control or precision in adjustments to the output of fast response heater 1. For example, the control unit 30 may sense the temperature of the metal 2 as it enters the fast response heater 1 at block 608. The control unit 30 may also sense the material thickness at block 609 and/or the metal travel speed at block 610. The control unit 30 can receive operator inputs such as the particular material at block 611 or desired process parameters at block 612. This information can be used to compare the actual process parameters to the desired parameters at block 604.

Exit parameters can be sensed or input into the control unit 30 so that additional feedback loops may be added to the sample control loop 600. For example, the control system may sense metal temperature as it exits the fast response heater 1 at block 613, flatness or quality of the metal as it exits the metal treatment furnace 10 at block 614, and/or metal temperature at the metal treatment furnace 10 at block 615. These exit parameters can then be compared to desired parameters in additional control loops similar to control loop 600, or added as sub-loops or additional variables into control loop 600.

The sample control loop 600 may be enacted to achieve the desired heat head (or other parameters) for one or multiple metal treatment furnace zones 11. The control loop 600 may also be used to control the heat head of the metal treatment furnace 10 as a whole. Similar control loops may also be used only in conjunction with the fast response heater 1, such as comparison of a desired and measured metal exit temperature at the fast response heater 1. It may also be possible to eliminate control loops altogether. The fast response heater 1 may be manually controlled by an operator, or may use thermal models which respond to user inputs and do not require any sensing, or reduced sensing, to control the output of the fast response heater 1.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

As used below, any reference to a series of examples is to be understood as a reference to each of those examples disjunctively (e.g., "Examples 1-4" is to be understood as "Examples 1, 2, 3, or 4").

Example 1 is a metal treatment system comprising: a metal treatment furnace having a furnace entrance for accepting a moving metal sheet, the metal treatment furnace comprising a sensor for measuring an atmospheric temperature within the metal treatment furnace; a fast response heater positionable proximate the furnace entrance to preheat the metal sheet; and a controller coupled to the sensor and the fast response heater to automatically control heat output of the fast response heater using the atmospheric temperature within the metal treatment furnace.

Example 2 is the metal treatment system of example 1, wherein the metal treatment furnace further comprising a second sensor for measuring a temperature of the moving metal sheet within the metal treatment furnace, and wherein the controller is further coupled to the second sensor to automatically control the heat output of the fast response heater further using the temperature of the moving metal sheet within the metal treatment furnace.

Example 3 is the metal treatment system of examples 1 or 2, wherein the fast response heater is operated continuously.

Example 4 is the metal treatment system of examples 1-3, wherein the atmospheric temperature of the metal treatment furnace remains within approximately ten percent of a preselected temperature.

Example 5 is the metal treatment system of examples 1-4, wherein the atmospheric temperature of the metal treatment furnace remains within approximately five percent of a preselected temperature.

Example 6 is the metal treatment system of examples 1-5, wherein the fast response heater is operated during transitions of the metal treatment furnace.

Example 7 is the metal treatment system of example 6, wherein the transitions of the metal treatment furnace comprise at least one transition selected from the group consisting of changes in metal sheet or plate thickness, metal sheet or plate processing speed, metal sheet or plate alloy, and metal treatment furnace target temperature.

Example 8 is the metal treatment system of examples 1-7, wherein the fast response heater comprises an induction heater.

Example 9 is the metal treatment system of examples 1-7, wherein the fast response heater comprises a direct flame impingement heater.

Example 10 is the metal treatment system of examples 1-7, wherein the fast response heater comprises an induction heater and a direct flame impingement heater.

Example 11 is the metal treatment system of examples 1-10, further comprising a thickness sensor for measuring a thickness of the metal sheet, wherein the controller is further coupled to the thickness sensor to automatically control the heat output of the fast response heater further using the thickness of the metal sheet.

Example 12 is the metal treatment system of examples 1-11, further comprising a throughput sensor for measuring a throughput of the metal sheet, wherein the controller is further coupled to the throughput sensor to automatically control the heat output of the fast response heater further using the throughput of the metal sheet.

Example 13 is the metal treatment system of examples 1-12, further comprising a data store containing a thermal model, wherein the controller is further coupled to the data store to automatically control the heat output of the fast response heater further using the thermal model.

Example 14 is the metal treatment system of example 13, wherein the thermal model comprises at least one parameter selected from the group consisting of fast response heater parameters, metal treatment furnace parameters, and metal characteristics.

Example 15 is the metal treatment system of examples 1-14, wherein the fast response heater includes a plurality of individual heating elements spaced across the fast response heater to selectively apply heat to individual portions across a width of the metal sheet, and wherein the controller is configured to individually control a heat output of each of the plurality of individual heating elements such that the plurality of individual heating elements selectively pre-heat the metal sheet across the width of the metal sheet.

Example 16 is the metal treatment system of examples 1-15, wherein the controller is configured to automatically control the heat output of the fast response heater using a heat head of the metal treatment furnace that is calculated using the atmospheric temperature of the metal treatment furnace.

Example 17 is a method of treating metal, the method comprising: pre-heating a metal sheet in a fast response heater; applying heat to the metal sheet in a metal treatment furnace; monitoring an atmospheric temperature within the metal treatment furnace; and automatically adjusting a heat output of the fast response heater using the monitored atmospheric temperature.

Example 18 is the method of example 17, further comprising monitoring a temperature of the moving metal sheet within the metal treatment furnace, wherein automatically adjusting the heat output of the fast response heater includes calculating a heat head using the monitored atmospheric temperature and the monitored temperature of the moving metal sheet, and adjusting the heat output of the fast response heater based on the calculated heat head.

Example 19 is the method of examples 17 or 18, wherein pre-heating the metal sheet in the fast response heater occurs continuously.

Example 20 is the method of examples 17-19, wherein applying heat to the meal sheet in the metal treatment furnace includes maintaining the metal treatment furnace at a constant temperature.

Example 21 is the method of examples 17-20, further comprising transitioning the atmospheric temperature of the metal treatment furnace between a first temperature setting and a second temperature setting, wherein automatically adjusting the heat output of the fast response heater includes selecting the heat output to compensate for changes to the atmospheric temperature of the metal treatment furnace during transitioning.

Example 22 is the method of examples 17-21, wherein the fast response heater comprises an induction heater.

Example 23 is the method of examples 17-21, wherein the fast response heater comprises a direct flame impingement heater.

Example 24 is the method of examples 17-21, wherein the fast response heater comprises an induction heater and a direct flame impingement heater.

Example 25 is the method of examples 17-24, further comprising monitoring a thickness of the metal sheet, wherein automatically adjusting the heat output of the fast response heater includes using the monitored thickness.

Example 26 is the method of examples 17-25, further comprising monitoring a throughput speed of the metal sheet, wherein automatically adjusting the heat output of the fast response heater includes using the monitored throughput speed.

Example 27 is the method of examples 17-26, wherein automatically adjusting the heat output of the fast response heater includes using a thermal model.

Example 28 is the method of example 27, wherein the thermal model comprises at least one parameter selected from the group consisting of fast response heater parameters, metal treatment furnace parameters, and metal characteristics.

Example 29 is the method of examples 17-28, wherein pre-heating the metal sheet in the fast response heater includes selectively applying heat across a width of the metal strip using a plurality of individual heating elements spaced across the fast response heater, and wherein automatically adjusting the heat output of the fast response heater includes individually controlling each of the plurality of individual heating elements to control the selective application of heat across the width of the metal strip.

What is claimed is:

1. A method of treating metal, the method comprising:
   pre-heating a metal sheet in a fast response heater;
   applying heat to the metal sheet in a metal treatment furnace;
   monitoring an atmospheric temperature within the metal treatment furnace; and
   adjusting a heat output of the fast response heater to increase the heat output based on the monitored atmospheric temperature being below a predetermined temperature and to decrease the heat output based on the monitored atmospheric temperature being above the predetermined temperature, wherein pre-heating the metal sheet in the fast response heater includes selectively applying heat across a width of the metal strip using a plurality of individual heating elements spaced across the fast response heater, and wherein adjusting the heat output of the fast response heater includes individually controlling each of the plurality of individual heating elements to control the selective application of heat across the width of the metal strip.

2. The method of claim 1, further comprising monitoring a temperature of the moving metal sheet within the metal treatment furnace, wherein adjusting the heat output of the fast response heater includes calculating a heat head based on the monitored atmospheric temperature and the monitored temperature of the moving metal sheet, and adjusting the heat output of the fast response heater based on the calculated heat head.

3. The method of claim 1, wherein pre-heating the metal sheet in the fast response heater occurs continuously.

4. The method of claim 1, wherein applying heat to the meal sheet in the metal treatment furnace includes maintaining the metal treatment furnace at a constant atmospheric temperature.

5. The method of claim 1, further comprising transitioning the atmospheric temperature of the metal treatment furnace between a first temperature setting and a second temperature setting, wherein adjusting the heat output of the fast response heater includes selecting the heat output to compensate for changes to the atmospheric temperature of the metal treatment furnace during transitioning.

6. The method of claim 1, wherein the fast response heater comprises an induction heater.

7. The method of claim 1, wherein the fast response heater comprises a direct flame impingement heater.

8. The method of claim 1, wherein the fast response heater comprises an induction heater and a direct flame impingement heater.

9. The method of claim 1, further comprising monitoring a thickness of the metal sheet, wherein adjusting the heat output of the fast response heater includes adjusting the heat output based on the monitored thickness.

10. The method of claim 1, further comprising monitoring a throughput speed of the metal sheet, wherein adjusting the heat output of the fast response heater includes adjusting the heat output based on the monitored throughput speed.

11. The method of claim 1, wherein adjusting the heat output of the fast response heater includes adjusting the heat output based on a thermal model.

12. The method of claim 11, wherein the thermal model comprises at least one parameter selected from the group consisting of fast response heater parameters, metal treatment furnace parameters, and metal characteristics.

13. A method of treating metal, the method comprising:
pre-heating a metal sheet in a fast response heater;
applying heat to the metal sheet in a metal treatment furnace;
monitoring an atmospheric temperature within the metal treatment furnace; and
adjusting a heat output of the fast response heater based on the monitored atmospheric temperature,
the method further comprising monitoring a temperature of the moving metal sheet within the metal treatment furnace, wherein adjusting the heat output of the fast response heater includes calculating a heat head based on the monitored atmospheric temperature and the monitored temperature of the moving metal sheet, and adjusting the heat output of the fast response heater based on the calculated heat head to increase the heat output based on the calculated heat head being below a predetermined temperature and to decrease the heat output based on the calculated heat head being above the predetermined temperature.

14. The method of claim 13, wherein pre-heating the metal sheet in the fast response heater occurs continuously.

15. The method of claim 13, wherein applying heat to the meal sheet in the metal treatment furnace includes maintaining the metal treatment furnace at a constant atmospheric temperature.

16. The method of claim 13, further comprising transitioning the atmospheric temperature of the metal treatment furnace between a first temperature setting and a second temperature setting, wherein adjusting the heat output of the fast response heater includes selecting the heat output to compensate for changes to the atmospheric temperature of the metal treatment furnace during transitioning.

17. The method of claim 13, wherein the fast response heater comprises at least one of an induction heater or a direct flame impingement heater.

18. The method of claim 13, further comprising monitoring a thickness of the metal sheet, wherein adjusting the heat output of the fast response heater includes adjusting the heat output based on the monitored thickness.

19. The method of claim 13, further comprising monitoring a throughput speed of the metal sheet, wherein adjusting the heat output of the fast response heater includes adjusting the heat output based on the monitored throughput speed.

20. The method of claim 13, wherein adjusting the heat output of the fast response heater includes adjusting the heat output based on a thermal model, and wherein the thermal model comprises at least one parameter selected from the group consisting of fast response heater parameters, metal treatment furnace parameters, and metal characteristics.

* * * * *